United States Patent
Paeschke et al.

(10) Patent No.: US 10,810,288 B2
(45) Date of Patent: Oct. 20, 2020

(54) METHOD AND SYSTEM FOR BEHAVIOR-BASED AUTHENTICATION OF A USER

(71) Applicant: NEXENIO GMBH, Berlin (DE)

(72) Inventors: Manfred Paeschke, Wandlitz (DE); Maxim Schnjakin, Berlin (DE); Philipp Berger, Berlin (DE); Patrick Hennig, Berlin (DE)

(73) Assignee: NEXENIO GMBH, Berlin (DE)

( * ) Notice: Subject to any disclaimer, the term of this patent is extended or adjusted under 35 U.S.C. 154(b) by 0 days.

(21) Appl. No.: 16/470,704

(22) PCT Filed: Dec. 15, 2017

(86) PCT No.: PCT/EP2017/083041
§ 371 (c)(1),
(2) Date: Jun. 18, 2019

(87) PCT Pub. No.: WO2018/114675
PCT Pub. Date: Jun. 28, 2018

(65) Prior Publication Data
US 2020/0089849 A1    Mar. 19, 2020

(30) Foreign Application Priority Data
Dec. 20, 2016    (DE) .................. 10 2016 225 648

(51) Int. Cl.
*G06F 21/31* (2013.01)
*G06K 9/62* (2006.01)
(Continued)

(52) U.S. Cl.
CPC ............ *G06F 21/316* (2013.01); *G06F 21/32* (2013.01); *G06K 9/00335* (2013.01); *G06K 9/628* (2013.01); *H04M 1/67* (2013.01)

(58) Field of Classification Search
CPC ....... G06F 21/316; G06F 21/32; G06K 9/628; G06K 9/00335; H04M 1/67
(Continued)

(56) References Cited

U.S. PATENT DOCUMENTS

2005/0033200 A1 *  2/2005  Soehren ............... A61B 5/0002
                                                        600/595
2007/0236330 A1 * 10/2007  Cho .................... G06F 21/305
                                                         340/5.54
(Continued)

FOREIGN PATENT DOCUMENTS

EP    2 458 524 A1 * 11/2010 ............. G06F 21/20
EP    2458524 A1      5/2012

OTHER PUBLICATIONS

Transmittal of International Search Report and Written Opinion (PCT/ISA/220) for PCT International Application No. PCT/EP2017/083041 dated Feb. 6, 2018.
(Continued)

*Primary Examiner* — William Nealon
(74) *Attorney, Agent, or Firm* — Harness, Dickey & Pierce, P.L.C.

(57) ABSTRACT

The method for the behavior-based authentication of the current user to a mobile, portable communication system includes repeated performance of capturing the gross-motor measurement data, inputting the gross-motor measurement data into the gross-motor classification module, generating a first classification result, and storing the first classification result. The method further includes accessing of the memory of the system in order to read out at least one of the stored first classification results from the memory, reading out of the at least one first classification result and evaluating same
(Continued)

in accordance with a specified checking criterion, and generating an authentication signal if the checking criterion is met.

28 Claims, 5 Drawing Sheets

(51) Int. Cl.
*H04M 1/67* (2006.01)
*G06F 21/32* (2013.01)
*G06K 9/00* (2006.01)

(58) Field of Classification Search
USPC .......................................................... 455/411
See application file for complete search history.

(56) References Cited

U.S. PATENT DOCUMENTS

| 2014/0089673 A1* | 3/2014 | Luna | H04L 63/0861 |
| | | | 713/186 |
| 2016/0234174 A1* | 8/2016 | Zizi | H04L 9/06 |
| 2017/0098068 A1* | 4/2017 | Mantri | G06F 21/36 |

OTHER PUBLICATIONS

International Search Report (PCT/ISA/210) for PCT International Application No. PCT/EP2017/083041 dated Feb. 6, 2018.
Written Opinion (PCT/ISA/237) for PCT International Application No. PCT/EP2017/083041 dated Feb. 6, 2018.
Notification Concerning Submission, Obtention or Transmittal of Priority Document (PCT/IB/304) for PCT International Application No. PCT/EP2017/083041 dated Feb. 6, 2018.

* cited by examiner

METHOD AND SYSTEM FOR BEHAVIOR-BASED AUTHENTICATION OF A USER

CROSS-REFERENCE TO RELATED APPLICATIONS

This application is a national phase under 35 U.S.C. § 371 of PCT International Application No. PCT/EP2017/083041 which has an international filing date of Dec. 15, 2017, which claims priority to German Application No. DE102016225648.3, filed Dec. 20, 2016, the entire contents of each of which are hereby incorporated by reference.

The invention relates to a method and a system for behaviour-based authentication of a user to a mobile, portable communication system.

Mobile, portable communication systems have become a staple in human day-to-day life, to such an extent that we can no longer imagine life without them. In order to gain access to such a system, a user usually has to authenticate himself via a personal identification number (PIN), a password, or possibly a fingerprint. In view of the large number of PIN-secured devices and applications used day-to-day by users and the associated high number of PINs to be remembered, it can easily be the case that a user forgets a PIN. Passwords, which often are freely selectable, are either too short and easily remembered, which has the disadvantage that they are guessed more quickly and therefore only offer a low level of security, or passwords that offer a high level of security are by contrast often long and complex, which makes it difficult for the user to remember them. Fingerprint sensors have the disadvantage that the user has to perform the extra task of placing his finger on the sensor. If the user is holding the mobile, portable communication system in the incorrect hand, the fingerprint sensors often already can no longer recognise the user. Furthermore, there are numerous situations in which a fingerprint sensor does not function correctly, for example if the user has dirty or wet fingers, not to mention if the user is wearing gloves.

By contrast, the object of the invention is to enable an improved method for authentication of a user.

The problem forming the basis of the invention is solved by the features of each of the independent claims. Embodiments of the invention are described in the dependent claims.

The invention proposes a method and a system for behaviour-based authentication of a user to a mobile, portable communication system, which enables authentication to the mobile, portable communication system without PIN or password. The authentication is based on an individual intrinsic behaviour of the user, which is defined by a natural behaviour pattern of the user. The behaviour-based authentication allows the user to gain access to his mobile, portable communication system as a result of the user behaving as normal. The user therefore does not have to remember a password, a PIN, a specific gesture or similar authentication means. Furthermore, the invention in accordance with embodiments does not presuppose a connection to a network outside the mobile, portable communication system, for example the Internet, since all fundamental data are captured by the mobile, portable communication system and all fundamental operations are performed by the mobile, portable communication system or its processor. In particular, sensitive data, which reflect a personal behaviour of the user, remain exclusively in an internal memory of the mobile, portable communication system.

Many mobile, portable communication systems, such as smartphones, are nowadays equipped anyway with sensors, which can capture the position of the device in space, whereby for example the display on the screen can rotate into the correct position relative to the spatial orientation of the device. Such a sensor is usually an acceleration sensor, a gyroscope or a combination thereof. It is not only possible with this sensor to capture the position in space of the mobile, portable communication system, but also a gross-motor movement of the user, whereby the sensor is used as a motion sensor.

A gross-motor movement in this context refers to all motor skills that a human can learn with his limbs, his torso and his head. Main muscle groups are utilised. Gross-motor skills are for example walking, jogging, running, skipping, bicycle riding or car driving. The movement of the arm in order to perform an action, for example lifting a glass in order to drink or eat, can also be interpreted as a gross-motor movement, as can an arm movement in order to remove a mobile telephone from a pocket. By contrast, the grasping of a cup is considered to be a fine-motor movement, since the movement for grasping the cup is performed using the fingers and finer muscle groups are utilised. A gross-motor movement may also comprise in particular a hip movement of the user.

Every person performs these gross-motor movements in his own way. A quite specific, characteristic gross-motor movement profile can thus be associated with a specific user of a mobile, portable communication system. The user is identifiable on the basis of this movement profile. The measurement data captured by the motion sensor are associated with a movement profile of this kind. The mobile, portable communication system is also equipped with a classification module, which is trained to recognise the movement patterns of the user. In this context, the term "training" means that the classification module has gained the ability to recognise generic and/or user-individual movement patterns by evaluation of training data sets. Training for recognition of a generic movement pattern for example comprises an evaluation of a plurality of training data sets of a user cohort, wherein the training data sets are assigned to one user each of the user cohort and comprise measurement data relating to a movement type identical for all users of the user cohort. A generic movement pattern common for the identical movement type of all users is identified as a result of the evaluation and is extracted for future recognition. Training for recognition of a user-individual movement pattern for example comprises an evaluation of movement data for an individual user, wherein the movement data comprise measurement data relating to a specific movement type. A user-individual movement pattern for the corresponding movement type is identified by the evaluation and is extracted for future recognition of user-individual movement patterns. The evaluation is performed for example with use of a generic movement pattern for the specific movement type, for which training was likewise carried out beforehand.

For the method for behaviour-based authentication of a user to a mobile, portable communication system, a distinction is made between two types of users. On the one hand, the user registered in the mobile, portable communication system is the user that is to be recognised by the mobile, portable communication system. On the other hand, the current user is the user that wishes to operate the mobile, portable communication system currently, for which purpose said user must authenticate himself. If the current user can be identified by the authentication process as being the user registered in the mobile, portable communication system, the current user is granted access to the mobile, portable communication system. If the current user does not match with the user registered in the mobile, portable communication system, the mobile, portable communication system thus identifies the current user as another person, not authorised for use, and refuses access. Hereinafter, the term "the user" denotes the current user of the mobile, portable communication system. If the user registered in the mobile, portable communication system is intended, this will be stated explicitly by the wording "the registered user".

A mobile, portable communication system can consist of an individual independent device or of a plurality of devices connected to one another mechanically and/or communicatively. Such a device can comprise for example: a smartphone, a tablet, a personal digital assistant, a pager, smartglasses, a smartwatch, navigation device, an activity tracker, or a device for recording medical data, in particular physiological data, such as a device for measuring pulse rate or a device for measuring blood pressure. The method for behaviour-based authentication can be performed by all mobile and portable devices and systems that are capable of processing electronic data and have at least one sensor for capturing a gross-motor movement.

By way of example, a mobile, portable communication system could consist of a smartphone and a smartwatch, wherein the smartphone has a sensor for capturing the gross-motor movement constituted by walking and the smartwatch measures the pulse and the blood pressure of the user. On the basis of a comparison of the data of the user and of the registered user, it can be identified whether or not the user is the registered user.

Such a mobile, portable communication system, in order to carry out the method for behaviour-based authentication of a user to the mobile, portable communication system, comprises at least one sensor for capturing measurement data relating to a gross-motor movement of the user (referred to hereinafter merely as "measurement data"), a gross-motor classification module, an operating system, a processor, and an internal memory. The sensor for capturing the measurement data is designed to capture a gross-motor movement of the user. The gross-motor classification module is configured for the classification of the measurement data, trained for recognition of a gross-motor movement of the user, and is executed by the processor of the mobile, portable communication system, the operating system being capable of controlling access to the mobile, portable communication system on the basis of the success of the authentication.

The method for behaviour-based authentication of a user to a mobile, portable communication system can be divided into two operative portions. Portion A comprises a repeated execution of the following steps:

capture of the measurement data by the at least one sensor of the mobile, portable communication system, input of the measurement data into the gross-motor classification module, generation of a first classification result by the gross-motor classification module, detailing whether the current user is the user registered in the mobile, portable communication system, and storage of the first classification result in the memory of the mobile, portable communication system.

These steps are repeated, whereby classification results are generated continuously and are stored in the memory of the mobile, portable communication system.

In the second portion of the method an application executed by the mobile, portable communication system sends an authentication request to the operating system of the mobile, portable communication system and/or an application program configured for the authentication, which application program is implemented on the mobile, portable communication system. An application can comprise, for example, an application program or an app which is implemented on the mobile, portable communication system and/or which is controlled via the mobile, portable communication system. Here, an application program is understood, without limitation, to mean any type of computer program which comprises machine-readable instructions for controlling a function of a computer. An application program of this type can be configured for example to process or to assist a useful or desired non-system-related function.

The processor of the mobile, portable communication system accesses the memory in response to the authentication request and reads out at least one first classification result. The at least one first classification result is then checked for a specific, predefined checking criterion. If the at least one first classification result meets the checking criterion, a signal is sent to the operating system of the mobile, portable communication system, wherein the signal comprises the information of the success of the authentication of the user to the mobile, portable communication system. If the checking criterion is not met by the at least one classification result, the user is not granted access to the mobile, portable communication system.

In accordance with an embodiment of the invention, the measurement data are captured by the at least one sensor in the form of a data stream (stream).

Due to the capture of the measurement data in the form of a stream, there is advantageously a maximum sensitive division of the first classification results per unit of time. Measurement data are captured continuously and are processed continuously to form first classification results. In this context, the term "continuously" means that the data are captured as often as permitted by the clock of the processor and/or the sensor. Since the classification results are available continuously, a real-time classification result can be called up at any time from the memory of the mobile, portable communication system, without the mobile, portable communication system having to first wait until a predetermined measurement interval has elapsed and current measurement data have been processed. Furthermore, new first classification results are generated continuously, so that, in the event of an authentication request, current first classification results are available, provided the user has moved recently.

In a further embodiment of the invention the mobile, portable communication system comprises an application behaviour classification module. The application behaviour classification module is configured to classify application data of a user and to find user-specific application patterns in the application data.

The application data can comprise for example the following data types:

position data of the mobile, portable communication system application data of the user biometric data of the user connection data of the mobile, portable communication system calendar and time data.

The position data of the mobile, portable communication system are captured by a method for position determination by a position sensor of the mobile, portable communication system. Such a method can comprise for example the capture of a GPS signal or a triangulated position from WLAN connection data or connection data of another radio network which comprises radio cells, such as a mobile network.

By the use of the position data for behaviour-based authentication of the user to the mobile, portable communication system, a regular position of the user (for example at home, at work or at other locations regularly frequented by the user) is advantageously captured. An unauthorised user, in particular a thief, who is using the mobile, portable communication system will not generally reside at the locations regularly frequented by the registered user. The mobile, portable communication system is thus able to recognise whether the user is the registered user. The position data can thus contribute to improving the behaviour-based authentication.

The application usage data include an application usage behaviour of the user, wherein the application usage behaviour comprises information describing when specific applications are started and/or executed by the user on the mobile, portable communication system. For example, it is thus possible to capture when and how often the user listens to the radio, moreover which application he uses to do so and/or which radio station he listens to, and also when and how often the user reads messages or operates his camera. In particular, applications used frequently day-to-day can provide a user-specific application usage profile, on the basis of which the user can be identified.

By including the application usage data of the user in the behaviour-based authentication method, the security of the mobile, portable communication system increases, since an unauthorised user, in particular a thief, who has stolen the mobile, portable communication system, would also have to imitate the application usage behaviour of the user in order to gain access to applications which require an authentication and/or in order to gain access to the mobile, portable communication system.

The biometric data can be captured by a sensor for capturing biometric data. The biometric data can be, amongst other things, the dimensions of the face, the voice frequencies of the user, the finger shape, the ear shape, the retina or iris pattern, the fingerprint of a finger, or physiological data, for example the blood pressure or the pulse of the user, in particular during specific activities, such as running.

In an embodiment of the invention the biometric data, in particular the dimensions of the face, the iris and/or retina pattern and the ear shape, can be captured when the user is using his mobile, portable communication system anyway and/or wishes to authenticate himself. At the time at which the user uses his mobile, portable communication system and/or wishes to authenticate himself, it can be assumed, depending on the executed application, that the user is looking at the screen of the system. This is the case for example with a chat or messaging application. Since commercial smartphones and other systems are equipped with cameras which are also positioned on the side of the screen on the mobile, portable communication system, it is possible that a background application of the mobile, portable communication system takes a photo of the user whilst he is using the mobile, portable communication system. This photo can be read out, and therefore the biometric data of the user captured. Should the user wish to access his system, a photo is created or one or more of the photos last stored is/are used, and the biometric data calculated from the created photo or the stored photos are used for authentication.

In a further embodiment the mobile, portable communication system for example comprises a pressure sensor or an optical sensor for capturing a pulse rate, by means of which the pulse and the blood pressure of the user can be determined.

By use of a biometric sensor worn directly on the body, in particular a biometric sensor of a smartwatch, for example a pressure sensor or optical sensor, the biometric data advantageously can be captured continuously, similarly to the measurement data, since the user wears the smartwatch on his wrist during regular use.

In a further embodiment the mobile, portable communication system comprises a sensor for capturing a fingerprint of the user. In advantageous embodiments the sensor is positioned at points of the mobile, portable communication system at which the user holds the mobile, portable communication system using his fingertips and/or regularly touches the mobile, portable communication system in order to control functions.

Due to the use of a fingerprint sensor, in particular at a point where the user's fingertips are located during regular use, the fingerprint, which is unique for every person, is advantageously used as an identification feature of the user in order to check the authenticity of the user, and thus increases the security of the method.

Due to the use of the biometric data of the user for behaviour-based authentication of the user to a mobile, portable communication system, the data used for authentication are advantageously dependent personally on the user to the greatest possible extent. In particular, biometric data offer a high security against forgery, whereby the security of the authentication method is increased.

The connection data of the mobile, portable communication system to other devices capable of communication, for example computers, domestic appliances capable of communication, or individual, mobile, portable communication devices and systems, can be used to demonstrate a typical connection pattern of the user. For example, individual devices can be connected to the mobile, portable communication system via WLAN, Bluetooth, radio frequency identification (RFID), near field communication (NFC) or a cable. A connection profile which contains information regarding the regular connections of the mobile, portable communication system to further devices can thus be created for the user.

For example, a user can connect the mobile, portable communication system to the private WLAN of a home or a public WLAN. In a further embodiment of the invention the user connects the mobile, portable communication system to domestic appliances and/or a computer via the Internet or an Intranet, thus resulting in a user-specific connection profile. This usage profile can comprise for example, without limitation, a washing machine, dryer, a refrigerator or similar domestic appliances, and devices of a smart home system, for example lighting, alarm system, air-conditioning system, heating system, audio system(s), video or television system(s), and/or a PC, which the user controls at home via the Internet, an Intranet or individual radio connections.

In a further embodiment of the invention an authentication request is sent by a device connected to the mobile, portable communication system to the operating system of the mobile, portable communication system and/or an application program which is configured for the authentication and which is implemented on the mobile, portable communication system, in order to authenticate the user to the devices which are connected to the mobile, portable communication system.

Due to the use of the connection data of the user for behaviour-based authentication of the user to a mobile, portable communication system, an unauthorised user advantageously must know the devices and, as appropriate, must have access to the devices to which the registered user normally connects the mobile, portable communication device.

Due to the use of the connection data for behaviour-based authentication of a user to a mobile, portable communication system, the current user, who for example is wearing a smartwatch, can advantageously authenticate himself to his mobile, portable communication system by wearing the smartwatch. The smartwatch thus functions as a kind of key, which releases the access to the mobile, portable communication system. A thief who has stolen the mobile, portable communication system would thus also have to be in possession of the smartwatch in order to gain access to the mobile, portable communication system.

Calendar and/or time data can be captured by a clock implemented in the mobile, portable communication system or by an external clock, the signal of which is received by a sensor, in particular a radio signal by a radio sensor, of the mobile, portable communication system.

In a further embodiment of the invention the connection data of the mobile, portable communication system are correlated with other devices and/or the position data of the mobile, portable communication system are correlated with the calendar and/or time data.

Due to the use of the calendar and/or time data for behaviour-based authentication of the user to the mobile, portable communication system, a time-specific application behaviour of the user advantageously can be created, in particular by the communication with the previous applications. For example, it can be recognised that from Monday to Friday the user is on his way to work and at that time listens to a specific radio station and at the weekend goes for a walk and at that time plays selected music via a music application, or that the user every evening at a fixed time, for example around 8 o'clock, reads messages via his mobile, portable communication system. The use of the calendar and/or time data thus results in an increased security of the mobile, portable communication system, since this data contribute to an application usage profile of the user that is structured in respect of time and that is more difficult to imitate as compared to an application usage profile that is unstructured in respect of time.

In a further embodiment the distance between two or more communication devices of a mobile, portable communication system is determined on the basis of the signal strength of the signal of the wireless connection between the devices. A wireless connection signal of this kind can be, for example, a Bluetooth signal, a WLAN signal, or a radio signal. The distance between the devices determined from the wireless connection signal can be captured in accordance with this embodiment as part of the application data and can be used for behaviour-based authentication of the user to a mobile, portable communication system.

The capture of the distance between two devices of a mobile, portable communication system as part of the application data and the use of the distance for behaviour-based authentication of the user to the mobile, portable communication system makes it possible to increase the security of the method for behaviour-based authentication, since a further parameter would have to be forged or imitated by an unauthorised user in order to gain access to the mobile, portable communication system.

In accordance with embodiments of the invention the distance is used to recognise a gross-motor movement pattern of the user.

In order to use the application data for behaviour-based authentication of the user to a mobile, portable communication system, the following steps are performed:
    capture of the application data,
    input of the application data into the application behaviour classification module,
    generation of a second classification result by the application behaviour classification module, detailing whether the current user is the user registered in the system,
    storage of the second classification result in the memory of the mobile, portable communication system.

When checking the first classification result against the checking criterion, not only is the first classification result used, which is based on the measurement data of the sensor for capturing gross-motor movement, but also the second classification result, which is given from the application data of the user.

In a further embodiment of the invention the mobile, portable communication system comprises a fine-motor classification module, which is designed to capture a fine-motor movement of the user, and a sensor for capturing a fine-motor movement in the form of fine-motor measurement data.

A fine-motor movement is a movement of fine muscle groups, for example the muscles of the fingers. The term "fine-motor skills" denotes targeted and coordinated movement, for example by the hand and/or finger muscles, but also the muscles of the mouth, the eyes and the face. The fine-motor movement, which is captured by a fine-motor sensor of the mobile, portable communication system, can comprise a specific movement of the fingers, for example.

In embodiments of the invention the input speed, the input clock time and/or the input accuracy of the user whilst he makes an input into the mobile, portable communication system are/is captured by the sensor for capturing a fine-motor movement. An input of this kind can be for example, without limitation, the typing of words or swiping of words, i.e. an input method similar to typing, in which the finger or the fingers maintains/maintain contact with the screen surface as letters are selected, on a virtual keyboard, the following of geometric figures shown on the screen, or another movement by means of which the user makes an input. Furthermore, fine-motor movements can comprise changes to the orientation, for example the angle of inclination, of the mobile, portable communication system during use.

A sensor for capturing a fine-motor movement can be formed for example as an optical system or as a touchpad or touchscreen, but in particular, without limitation, a resistive touchscreen, a surface-capacitive touchscreen, a projected capacitive touchscreen, or an inductive touchscreen.

In order to use the fine-motor measurement data for fine-motor authentication of the user to a mobile, portable communication system, the following steps are performed:
    capture of the fine-motor measurement data,
    input of the fine-motor measurement data into the fine-motor classification module,
    generation of a third classification result by the fine-motor classification module, detailing whether the current user is the user registered in the system, storage of the third classification result in the memory of the mobile, portable communication system.

When checking the first classification result against the checking criterion, not only is the first classification result used, which is based on the measurement data of the sensor for capturing gross-motor movement, but also the third classification result, which is given from the fine-motor data of the user.

Due to the use of a fine-motor movement of a user, the security of the method increases, since further parameters are necessary in order to authenticate the user to the mobile, portable communication system.

In a further embodiment of the invention the user is invited, following a failed authentication attempt, to make an input into the mobile, portable communication system so as to be able to capture a fine-motor movement of the user. The input can comprise, for example, the drawing of a specific figure on the screen or the input of a predefined word or the input of a number of words. The words and/or patterns can be predefined by the system or the user or can be selected randomly. For example, the corresponding words and/or patterns are displayed on the screen.

Due to the authentication by means of a fine-motor movement in the case of a failed authentication by means of a gross-motor movement and/or application data, the user is advantageously provided with the possibility to authenticate himself in spite of a failed authentication via a gross-motor movement and/or his application usage behaviour, without having to use a PIN or a password.

On account of the similarity of the processing structure of the measurement data and the application data, the following explanations apply equally for the measurement data and the application data, the gross-motor, application behaviour and fine-motor classification module, and the first, second and/or third classification result. For example, "the classification result" is used hereinafter representatively for "the first and/or second and/or third classification result". It should be noted that the plural "classification results" then also includes a plurality of the first and/or second and/or third classification results. Furthermore, the term "measurement data" hereinafter denotes the measurement data of the sensor for capturing a gross-motor movement and/or the measurement data of the sensor for capturing a fine-motor movement. If only the measurement data of the sensor for capturing a gross-motor movement or a fine-motor movement are meant, this will be stated explicitly.

Furthermore, in accordance with a further embodiment, the gross-motor classification module and/or the application behaviour classification module and/or the fine-motor classification module are/is formed as a classification module which is capable of processing the measurement data and the application data. In accordance with this embodiment the classification module generates an individual classification result. For example, in accordance with a further embodiment, the gross-motor classification module and/or the application behaviour classification module and/or the fine-motor classification module are/is comprised by the same application program or by different application programs, which is/are configured to perform a behaviour-based authentication.

The classification module or the classification modules, i.e. the gross-motor classification module and/or the application behaviour classification module and/or the fine-motor classification module, generates/generate for example a common classification result with use of confidence values, which have been determined by the classification module or the classification modules in each case for classification-module-specific measurement data. In this case, the first, second and/or third classification result is the same classification result to which the gross-motor classification module and/or the application behaviour classification module and/or the fine-motor classification module contribute.

In a further embodiment of the invention, in the event of an unsuccessful checking of the at least one classification result against the checking criterion, a signal is sent, which comprises the information regarding the failed authentication. A signal of this kind, in accordance with an embodiment of the invention, can be limited to the information of the failed authentication. In accordance with further embodiments the signal can contain the information regarding the reason for the failure of the authentication. Such a reason, in accordance with further embodiments of the invention, can include, for example, the age of the current at least one classification result, the at least one classification result itself, or another reason for the failure. In an embodiment of the invention a checking criterion can include the fact that the at least one classification result is not older than a few minutes, a few hours, a day or a week. In a further embodiment of the invention the checking criterion can include the fact that the at least one classification result must reach a specific threshold value.

By the sending of a signal in the event of failed authentication, the user is advantageously informed that his authentication has failed and can behave purposefully such that he can gain access to the mobile, portable communication system. For example, the signal indicates that the walking style of the user has not been recognised. The user notes the signal and starts to walk back-and-forth until the checking criterion is met. Such a signal can be displayed to the user for example by means of a display of the mobile, portable communication system, can be communicated acoustically via a loudspeaker of the mobile, portable communication system, or can be signalled by means of a vibration pattern, generated by a vibration mechanism of the mobile, portable communication system.

In a further embodiment of the invention at least one pattern in the form of a pattern function and at least one comparison data set are stored in the memory of the mobile, portable communication system, wherein the comparison data set contains values for at least one comparison parameter, wherein the following steps are performed by the relevant classification module:
 a) Comparison of the captured measurement data and application data with the at least one pattern function.
 b) Assignment of the measurement data and application data to one of the patterns corresponding to the pattern function and attainment of at least one classification parameter corresponding to the pattern by the classification module, if the measurement data and/or application data can be assigned to the at least one pattern.
 c) Calculation of a confidence value for each classification parameter by a comparison of the at least one classification parameter with the relevant comparison parameter of the comparison data set.
 d) Generation of the classification result from the at least one confidence value of the at least one classification parameter.

Due to the generation of the classification result from the at least one confidence value of the at least one classification parameter, a method is advantageously provided which can be bypassed repeatedly by fixedly defined steps for the user, but is very difficult to bypass for an unauthorised user. An attacker attempting to access the mobile, portable communication system by means of an electronic attack in which the attacker attempts to guess the measurement data and application data of the at least one sensor, the at least one classification parameter or the at least one confidence value in order to fake a classification result to the mobile, portable communication system, would have to be familiar with or know: the at least one pattern function; which of the classification parameters are processed into confidence values; and which values these must comprise in order for access to be granted to the mobile, portable communication system.

In a further embodiment of the invention the confidence values of the classification parameters are stored in the memory of the mobile, portable communication system. The sum of the confidence values of the classification parameters forms the classification result.

Due to the storage of the confidence values as classification result, the confidence values advantageously can be used individually for the checking operation. In a further embodiment of the invention, for authentication requests with a low checking criterion, fewer confidence values are read out from the memory and checked than in the case of an authentication request with a higher checking criterion. A low checking criterion may then be present for example if the user wishes to change the radio station. A high checking criterion can be present for example if the user wishes to call up the contact data stored in the mobile, portable communication system. In a further embodiment the checking criterion for each confidence value comprises a different threshold value, such that the quality of the individual classification parameters in which the confidence values are calculated is taken into consideration when checking the classification result against the checking criterion. In a further embodiment of the invention the checking criterion comprises the stipulation that the at least one confidence value must reach a specific threshold value in order to achieve successful authentication of the user.

Since the checking criterion consists of the stipulation that a confidence value must reach a minimum level, the checking of the classification results against the checking results can be performed advantageously by the comparison of just one value. For this step, very few operations are therefore necessary, and therefore the processor has to perform fewer computing operations. The mobile, portable communication system thus experiences a reduced energy consumption. In particular for mobile, portable communication systems which are operated by battery, an embodiment of this kind is advantageous.

In a further embodiment of the invention the checking criterion comprises the stipulation that a plurality of stored confidence values must each reach an individual threshold value.

Since the checking criterion comprises an individual threshold value for each of a plurality of confidence values, the checking criterion can be individually adapted to the particular accuracies of the individual confidence values. This results in an increased accuracy of the authentication process as a whole.

In accordance with a further embodiment of the invention the second classification result, which is based on the application data, is included in the checking of the classification results against the checking criterion only if, in a previous step, the first classification module recognised a gross-motor movement of the user in the measurement data. For example, application usage data of a radio are thus captured only if the user is currently walking. In a further embodiment of the invention a removal of the mobile, portable communication system from a pocket can be rec- ognised, whereupon for example the execution of a messaging application is used as a part of the application usage profile.

Due to the use of the second classification result, which is based on the application data, in combination with the recognised gross-motor movement of the user, the classification of the first classification module, which uses the measurement data, advantageously can be much more accurate, since the classification result on the basis of the application data can be used in order to refine the classification result based on the measurement data.

In a further embodiment of the invention the confidence values, which result ultimately from the gross-motor and/or fine-motor measurement data and/or the application data, are combined to form a resultant confidence value. The combining of this data can comprise for example, but not necessarily, the forming of a mean value, a median or a modal value. The forming of the resultant confidence value makes it possible to specify the likelihood with which the current user is the user registered in the mobile, portable communication system.

Due to the forming of a resultant confidence value and the use of the resultant confidence value for behaviour-based authentication of the user to the mobile, portable communication system, only a single numerical value advantageously is necessary for the authentication, in order to authenticate the user. No details regarding the application usage or the person of the user are sent to the application requiring the authentication in order to authenticate the user. This protects in particular the data security and the anonymity of the user, since, from the resultant confidence value, it is no longer discernible which confidence values or classification parameters this confidence value is composed of in detail or what values each of these have.

In a further embodiment of the invention the individual confidence values of the classification parameters are weighted in each case with a weighting factor for the evaluation. The weighting factors are assigned to the relevant confidence value.

Due to the use of weighting factors for the respective confidence values when calculating the resultant confidence value, the accuracy of the resultant confidence value when checking against a checking criterion advantageously can be increased. Individual confidence values, which result from different classification parameters, can be weighted depending on the importance and/or accuracy of their determinability. Since each user behaves differently, the individual classification parameters also play varying roles in the behaviour-based authentication of the user to the mobile, portable communication system. A first user of a first mobile, portable communication system for example could regularly use a radio application of his mobile, portable communication system, whereas a second user of a second mobile, portable communication system might never use a radio application. Due to the possibility of weighting the individual confidence values, a higher weighting factor can be allocated to the confidence value for the use of a radio application for the first user than for the second user.

In a further embodiment, the weighting factors of the confidence values are specified by the checking criterion.

By specifying the weighting factors by the checking criterion, different confidence values advantageously can be weighted individually in dependence on the security level of the checking criterion. For example, in the case of checking criteria which require a very high authentication likelihood, all parameters can be included, whereby all confidence values are calculated in order to give a resultant confidence value. By contrast, in the case of a checking criterion which requires a low security level, only some of the confidence values or classification parameters or only an individual confidence value or classification parameter are/is used for the evaluation.

In a further embodiment of the invention the individual weighting factors of the respective confidence values are fixedly specified. In this context, the expression "fixedly specified" means that the weighting factors are defined from the outset at the time of initial commissioning of the mobile, portable communication system, and no changes to the weighting factors are provided during the intended operation of the mobile, portable communication system.

Due to the specifying of the weighting factors for the confidence values, there is advantageously a reduced computing effort, which results in a low battery consumption in particular for mobile portable communication systems. The mobile, portable communication system does not have to check which weighting factors are to be defined for which confidence value, but instead must ultimately only read out from its memory the appropriate confidence values, which are already set against the weighting factors.

In a further embodiment of the invention the user himself defines the weighting factors of the individual confidence values in an initiation process. The defined weighting factors are then stored in a configuration file in the memory of the mobile, portable communication system.

Due to the fact that the weighting factors are defined by the registered user himself, the registered user himself advantageously can determine the extent to which his applications or behaviour patterns contribute to the behaviour-based authentication. This increases the freedom of the registered user in the configuration of the system, since the registered user himself can decide which classification parameters are included by his behaviour pattern. For example, the registered user can define that the use of the radio application should not be included or should only be included to a very minor extent in the generation of the classification results, since he usually only uses the radio application sporadically. By contrast, the same user could allow the confidence values of the position determination to be included to a greater extent in the generation of the classification result, since he has a very structured day-to-day timetable and frequents specific locations with a high level of regularity.

In a further embodiment of the invention the checking criterion is defined by the executed application requesting the authentication of the user.

The fact of the checking criterion being defined by the executed application results advantageously in that the security of the authentication by means of the checking criterion can be determined by the application. For example, applications for online banking can require a much higher security level of the user to the mobile, portable communication system than a music application.

In a further embodiment of the invention the mobile, portable communication system is connected to a network, for example the Internet or a local network (LANS), a private network, in particular an Intranet, or a virtual private network (VPN). Within the network, the mobile, portable communication system can communicate with an online application via an appropriate interface, which is usually configured as a browser or launcher, wherein the online application is executed on a device within the network, but outside the mobile, portable communication system. The online application is capable of requesting the mobile, portable communication system to authenticate itself to the application, whereupon the mobile, portable communication system sends the resultant confidence value to the online application.

Due to the sending of the resultant confidence value to the online application, the mobile, portable communication system is advantageously capable of authenticating the user applications which are not installed on the mobile, portable communication system. The method therefore does not require an application to be installed on the mobile, portable communication system.

In a further embodiment of the invention a number of users are registered on the mobile, portable communication system, and the classification result is generated for each registered user. A user identification module then decides which user is currently active, wherein the user identification module is likewise executed by the processor of the mobile, portable communication system.

In a further embodiment of the invention the user is identified by the user identification module by means of a decision tree.

Due to the possibility of identifying a number of users, it is possible for service devices or service systems, which are given by an employer to a number of employees, wherein the number of employees use the particular mobile, portable communication system in alternation, to advantageously also apply the method for behaviour-based authentication.

In a further embodiment of the invention the user identification module is configured such that it recognises a change in user on the basis of gross-motor and/or fine-motor measurement data. The user identification module generates a fourth classification result, which specifies which of the registered users is the current user. The fourth classification result is then formed if the user identification module recognises a movement that is typical for a change in user of a mobile, portable communication system. A typical movement can include the taking off and putting back on again of a smartwatch, the handing over of a mobile telephone, or a comparable movement.

The user identification module is configured to recognise a change in user on the basis of a gross-motor and/or fine-motor movement. To this end, the user identification module is configured for example to recognise a gross-motor and/or fine-motor movement constituted by the taking off and/or putting on of the mobile, portable communication system. The user identification module is furthermore trained to recognise user-specific movement patterns in the measurement data and/or the fine-motor measurement data, wherein the user identification module performs the following steps repeatedly:

input of the measurement data and/or fine-motor measurement data into the user identification module, generation of a fourth classification result by the user identification module, detailing whether a change in user has occurred, storage of the fourth classification result in the memory of the mobile, portable communication system.

The user identification module then accesses the memory of the mobile, portable communication system in order to read out at least one of the stored fourth classification results from the memory. The at least one fourth classification result is evaluated in order to check whether a change of user has occurred. The previous first, second and/or third classification results are discarded in the case of a change of user so as to ensure that, in the event of a change in user, a non-authenticated user then uses the mobile, portable communication system. This non-authenticated user then has to authenticate himself.

In a further embodiment of the invention the user identification module is configured such that it recognises an at least temporary termination of the use of the mobile, portable communication system by the current user on the basis of gross-motor and/or fine-motor measurement data. To this end, the user identification module is configured for example to recognise a gross-motor and/or fine-motor movement constituted by a taking off of the mobile, portable communication system. If such a termination is recognised, for example the previous first, second and/or third classification results are discarded, in order to ensure that, in the event of a possible change of user, a non-authenticated user then uses the mobile, portable communication system. This non-authenticated user then has to authenticate himself.

DESCRIPTION OF THE FIGURES

The invention will be explained in greater detail hereinafter with reference to the drawings, in which.

Elements in the following embodiments that correspond to one another are denoted by the same reference signs.

Figure 1:
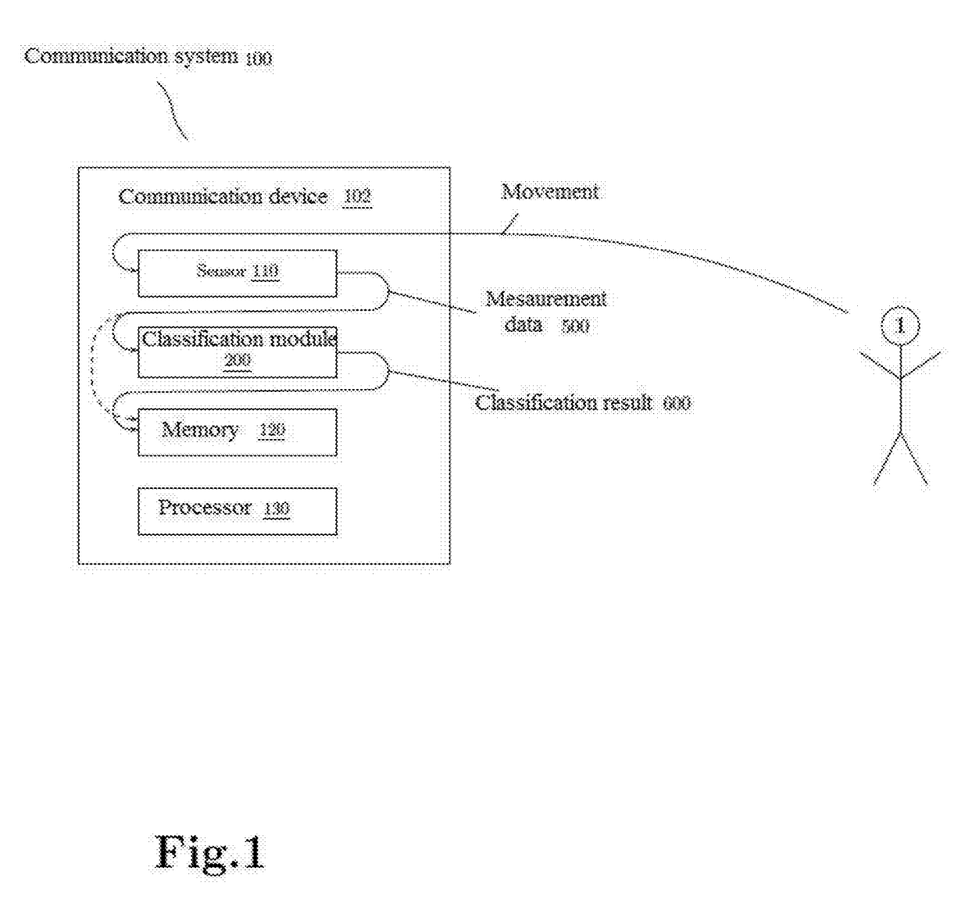
FIG. 1 shows a schematic structure of an exemplary mobile, portable communication system for carrying out the method for behaviour-based authentication of a user.

FIG. 1 shows the schematic structure of an embodiment of a mobile, portable communication system 100, which is carried by a user 1. The mobile, portable communication system in this embodiment is an individual mobile, portable communication device 102. The mobile, portable communication device 102 is suitable for carrying out a method for behaviour-based authentication of the user 1 to the mobile, portable communication system 100. The mobile, portable communication device 102 has a sensor 110, which is suitable for capturing a gross-motor movement of the user 1 as measurement data 500. The mobile, portable communication device 102 also has a memory 120, in which the measurement data 500 can be stored in processed form as classification results 600. The mobile, portable communication device 102 also has a processor 130, which executes the gross-motor classification module 200.

If the user 1 performs a gross-motor movement and at the same time is carrying the mobile communication device 102, the sensor 110 can capture this movement in the form of measurement data 500. The sensor 110 can be configured for example as an acceleration sensor or a gyroscope or a combination thereof. The movement of the current user 1 for example can be walking, jogging, running or a movement of the arm, if the device which has the sensor 110 and is part of the mobile, portable communication system 100 is fastened to the arm.

For example, a gross-motor movement can be understood to mean movement sequences such as walking, jogging, running, skipping, climbing, balancing, bicycle riding, car driving or a movement of the arm, for example when drinking, when looking at a wristwatch, or when removing the mobile, portable communication system 100 from a pocket.

The gross-motor classification module 200 receives the measurement data 500 from the sensor 110 and classifies the measurement data 500 as a gross-motor movement. Based on the classification, the gross-motor classification module 200 generates the classification result 600. This classification result 600 is stored in the memory 120 of the mobile, portable communication device 102.

Figure 2:
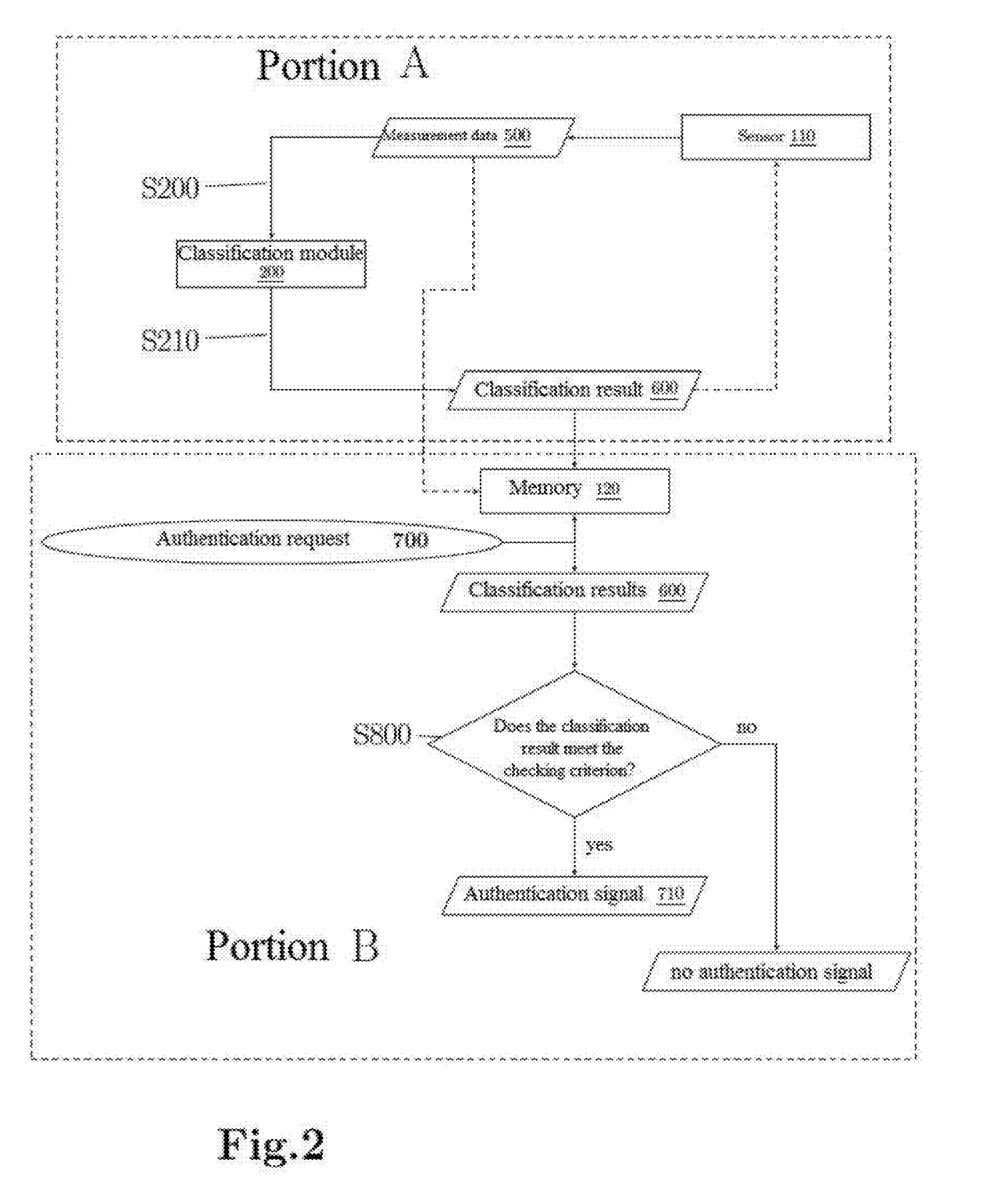
FIG. 2 shows a schematic course of a behaviour-based authentication in a flow diagram.

FIG. 2 shows the authentication method 400 for behaviour-based authentication of a user to a mobile, portable communication system 100 in a flow diagram. The authentication method 400 can be divided into two portions A and B. Portion A is performed repeatedly and thus forms a loop-like execution structure. The sensor 110 captures the gross-motor movement of the user 1 as measurement data 500. The measurement data 500 are input in step S200 into the gross-motor classification module 200. Based on the measurement data 500, the gross-motor classification module 200 in step S210 generates the classification result 600. The generated classification result 600 is stored in the memory 120 of the mobile, portable classification system 100. The sensor 110 then captures new measurement data 500. The entire method according to portion A is executed repeatedly.

In an embodiment of the invention the sensor 110 captures the measurement data 500 in the form of the data stream (stream), wherein the gross-motor classification module 200 receives and processes the measurement data 500 in the form of a stream. The classification results 600 are stored in the memory 120 of the mobile, portable communication system 100 at very short time intervals, which are specified by the clock rate of the processor and/or the sensor.

Portion B is then executed when an application sends an authentication request 700 to the operating system and/or an application program of the mobile, portable communication system 100, which application program is configured for behaviour-based authentication. The authentication request 700 includes a request to read out at least one classification result 600 from the memory 120. The at least one classification result is then read out from the memory 120, and in step S800 is checked by the operating system or the application program configured for behaviour-based authentication against a checking criterion 800. If the classification result 600 meets the checking criterion 800, the operating system or the application program generates an authentication signal 710. If the classification result 600 does not meet the checking criterion 800, no authentication signal 710 is generated. In an embodiment of the invention a plurality of classification results 600 are read out from the memory 120 of the mobile, portable communication system 100 and are checked against the checking criterion 800.

Figure 3:
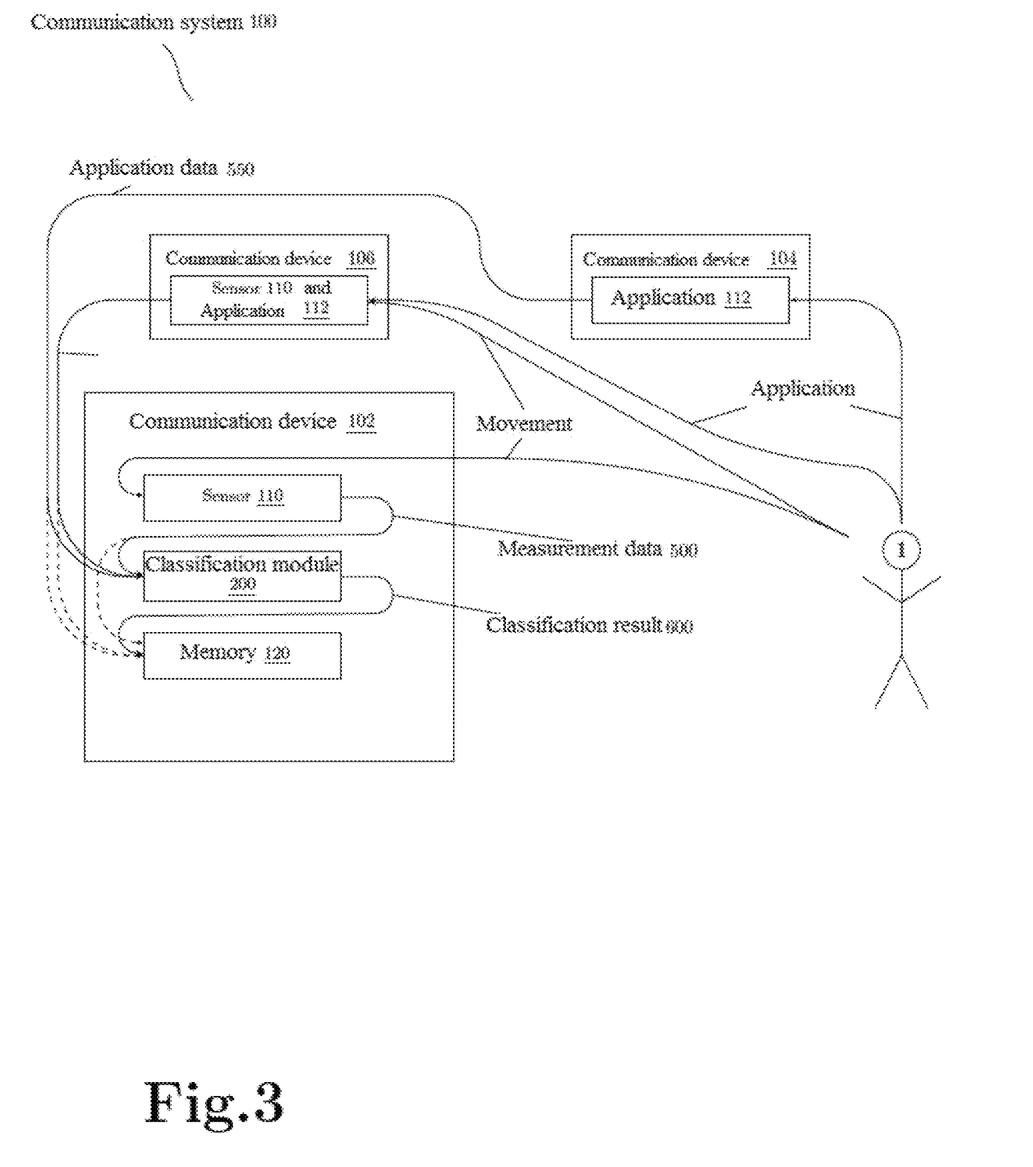
FIG. 3 shows an embodiment of the mobile, portable communication system for carrying out the method for behaviour-based authentication of a user.

FIG. 3 shows a further embodiment of the invention. The schematic structure of a mobile, portable communication system 100 is shown, which consists of a plurality of communication devices 102, 104 and 106. The communication devices 102, 104 and 106 are carried by the user 1, for example. The communication devices 102, 104 and 106 are capable of communicating with one another via a communication interface in each device. The communication devices 102, 104 and 106 are capable of communicating with one another via a communication interface in each device. Suitable communication can be performed for example via Bluetooth, WLAN, RFID, NFC or a cable connection.

In various embodiments of the invention the mobile, portable communication system 100 can comprise one, two, three or more mobile, portable communication devices.

The communication devices 102, 104 and 106 are each equipped with sensors 110 and applications 112. The sensors 110 can be for example sensors for capturing a gross-motor movement, for example an acceleration sensor or a gyroscope. The applications 112 generate application data 550.

In further embodiments of the invention the applications 112 can access sensors for capturing the position of the mobile, portable communication system 100, sensors for capturing biometric data, in particular a camera for capturing shape features such as face shape, ear shape or palm line shape, a fingerprint sensor, or physiological sensors, which for example measure the blood pressure or the pulse of the user 1, wherein these sensors are comprised by the mobile, portable communication system.

In a further embodiment of the invention a sensor for capturing fine-motor movements captures a fine-motor movement of the user. The sensor for capturing fine-motor movements can be embodied as a screen, in particular as a touchscreen.

The measurement data 500, 510 and the application data 550, once they have been captured by the sensors 110 and the applications 112, are sent from the communication devices 102, 104 and 106 to the classification modules 200. The classification modules 200 determine confidence values for the measurement data 500, 510 and the application data 550, on which basis the classification result 600 is generated. The generated classification result 600 is then stored in the memory 120.

Figure 4:
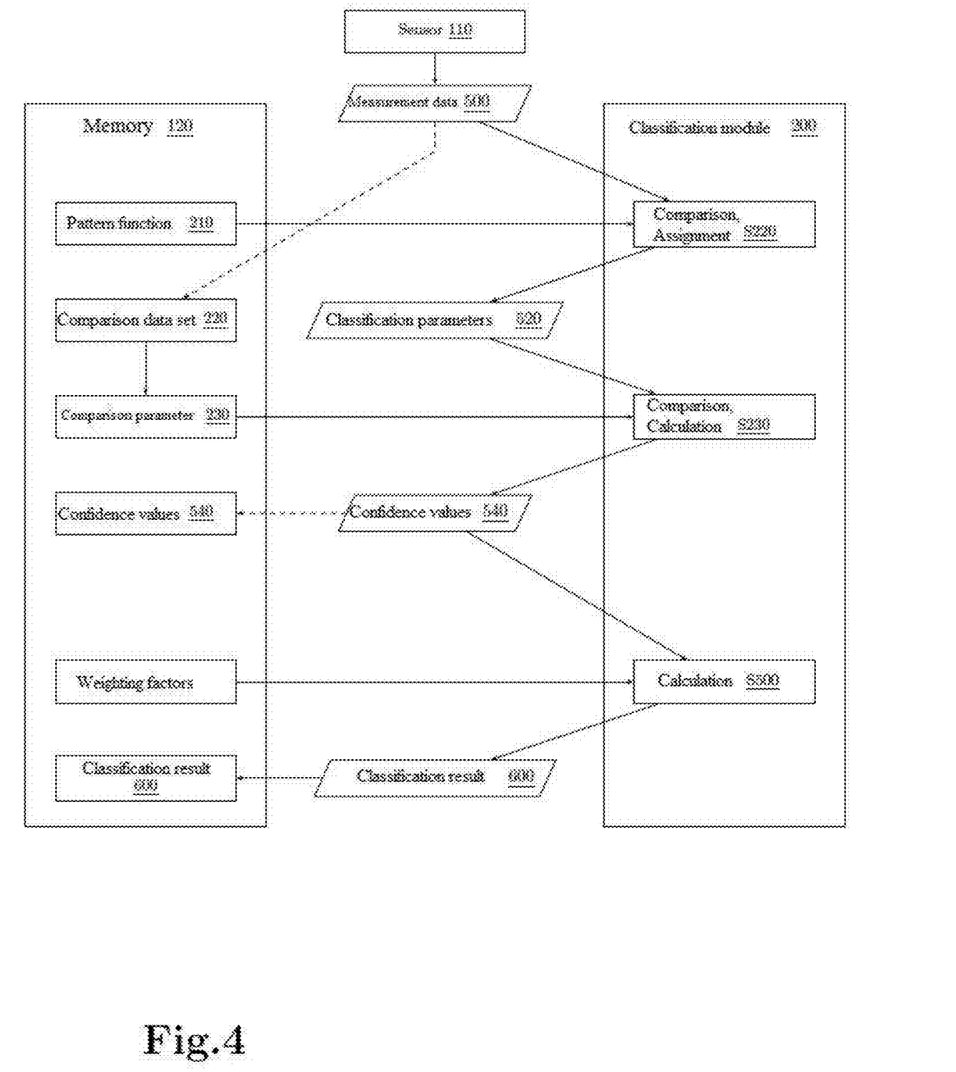
FIG. 4 shows a schematic method for handling data processed by the mobile, portable communication system.

FIG. 4 shows the schematic structure for determining the classification result 600 from the measurement data 500. Firstly, a sensor 110 captures the gross-motor movement of the user 1 in the form of measurement data 500. The measurement data 500 are then sent to the gross-motor classification module 200. The gross-motor classification module 200 calls up a pattern function 210 from the memory and in step S220 compares the pattern function 210 with the measurement data 500. The measurement data 500 are assigned to a first number of classification parameters 520. A comparison data set 220, which contains data reflecting the gross-motor movement of the user, wherein the data of the comparison data set 220 have the structure of the measurement data 500, is stored in the memory 120 of the mobile, portable communication system 100.

Comparison parameters 230, which were calculated from the data of the comparison data set 220, are assigned to the comparison data set 220. The gross-motor classification module 200 reads out the comparison parameters 230 from the memory 120 of the mobile, portable communication system and compares the comparison parameters 230 with the classification parameters 520 in step S230. Based on the difference, the gross-motor classification module 200 calculates at least one confidence value 540, wherein each confidence value 540 is assigned a classification parameter 520 and therefore the number of classification parameters 520 is equal to the number of confidence values 540.

The confidence values 540 are then processed in step S500, for example by forming the mean value, the median, mode or by a more complex calculation, in order to form a classification result 600. The classification result 600 is stored in the memory 120 of the mobile, portable communication system 100. In the event of an authentication request, the classification result 600 is read out from the memory 120 of the mobile, portable communication system 100.

In an embodiment of the invention the application data 550 and the fine-motor measurement data 510 are processed similarly to the measurement data 500. In accordance with this embodiment the fundamental structure of the various classification modules is the same or similar, since each module performs the same operations. The commands are adapted in the modules to the particular input data.

In a further embodiment of the invention the confidence values 540 are stored directly in the memory 120 of the mobile, portable communication system 100 and can be read out in the event of an authentication request 700.

Figure 5:
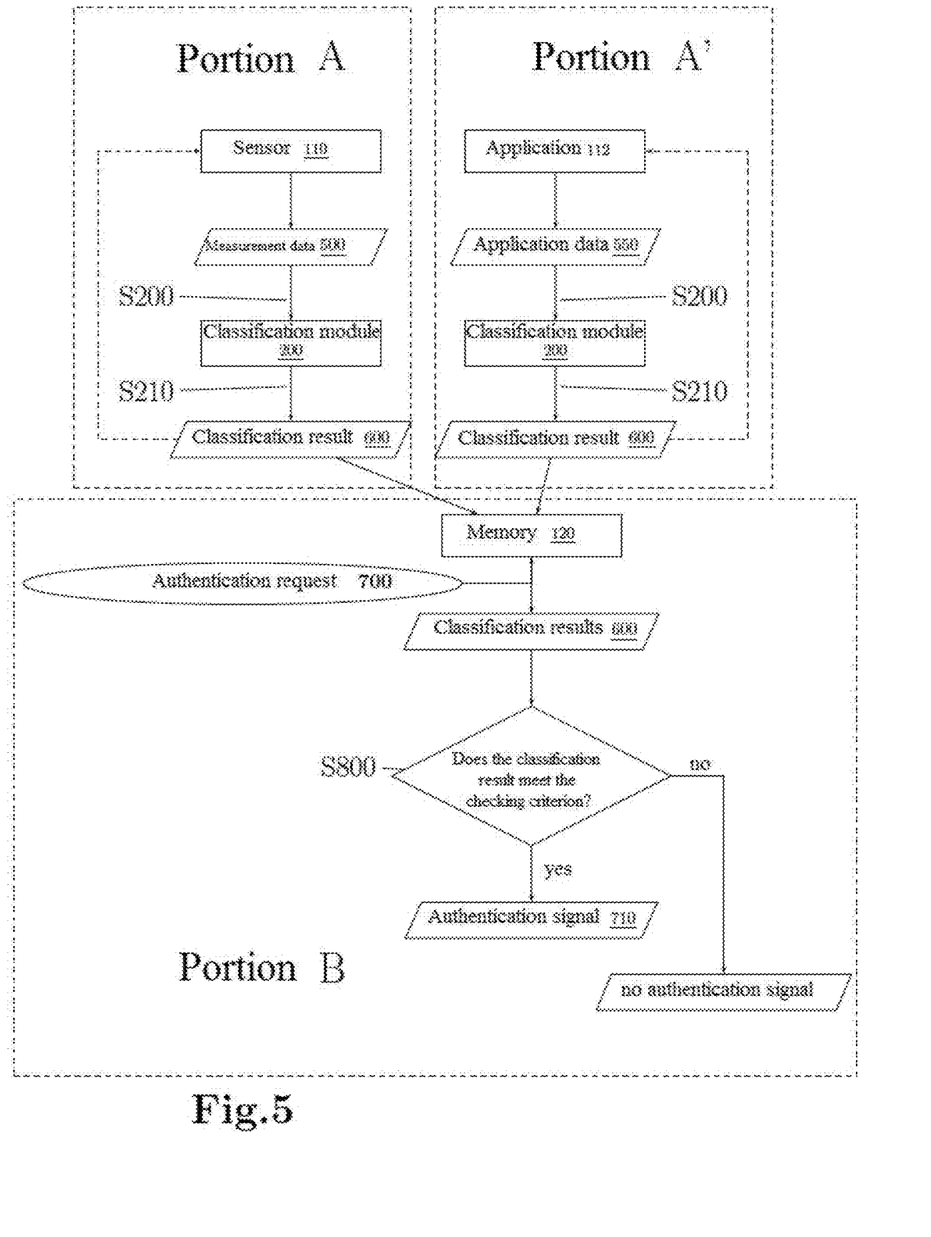
FIG. 5 shows a flow diagram of an exemplary method which, besides measurement data, also takes into consideration application data.

FIG. 5 shows, in a flow diagram, the schematic course of a further embodiment of the invention. In accordance with this embodiment of the invention, application data 550 are captured in addition to the measurement data 500 and are processed. The application data 550 can comprise the position data of the mobile, portable communication system, which data are captured by a method for position determination by a position sensor of the mobile, portable communication system 100, the application usage data of the user 1, the biometric data of the user 1, which data are captured by a sensor for capturing biometric data, the connection data of the mobile, portable communication system 100 with other devices, or the calendar and/or time data of a clock implemented in the mobile, portable communication system 100 or an external clock, the signal of which is received by a sensor of the mobile, portable communication system 100.

The method loop A' is executed similarly to the method loop A according to FIG. 2, wherein, instead of the measurement data 500, the application data 550 are input into the application behaviour classification module 200. Method loop A and method loop A' each generate a classification result 600, which is stored in the memory 120 of the mobile, portable communication system 100.

In a further embodiment of the invention the classification result 600 contains the processed measurement data 500, the processed application data 550 and the processed fine-motor measurement data 510. The fine-motor measurement data 510 are processed by a separate method loop A" (not shown here).

Method loop A" is executed similarly to method loop A according to FIG. 2, wherein, instead of the measurement data 500, the measurement data 510 are input into the fine-motor classification module 200. Method loop A and method loop A" each generate a classification result 600, which is stored in the memory 120 of the mobile, portable communication system 100.

In response to an authentication request 700, the at least one classification result 600 is read out and is checked against a checking criterion 800. The result of the checking of the classification result 600 against the checking criterion 800 determines whether or not an authentication signal 710 is sent. An authentication signal 710 is generated and sent if the checking criterion 800 is met. If the checking criterion 800 is not met, no authentication signal 710 is generated.

In a further embodiment of the invention a signal which displays the failure of the authentication of the current user 1 to the mobile, portable communication system 100 is generated in the event that the checking criterion 800 is not met.

The steps of the authentication request 700, the reading out of the at least one classification result 600, the checking of the at least one classification result 600 against a checking criterion 800, and the generation of an authentication signal 710 are represented by the method loop B.

LIST OF REFERENCE SIGNS

1: user
100: communication system
102: communication device
104: communication device
106: communication device
110: sensor
112: application
120: memory
130: processor
200: classification module
210: pattern function
220: comparison data set
230: comparison parameter
400: authentication method
500: measurement data
510: fine-motor measurement data
520: classification parameter
540: confidence values
550: application data
600: classification result
700: authentication request
710: authentication signal
800: examination criterion
900: application
S200: input of the measurement data in the classification module
S210: generation of the classification result
S220: comparison of the measurement data with the pattern function
S230: comparison of the classification parameters with the comparison parameters
S500: calculation of the classification result
S800: checking of the classification result

The invention claimed is:

1. A method for behaviour-based authentication of a current user to a mobile, portable communication system, which has at least one sensor for capturing measurement data, a gross-motor classification module, a processor and an internal memory,
wherein the sensor is designed to capture the gross-motor measurement data of a gross-motor movement of a current user of the mobile, portable communication system,
wherein the gross-motor classification module is configured for classification of the gross-motor measurement data and is trained for recognition of a gross-motor movement of a registered user, wherein the gross-motor classification module is executed by the processor of the mobile portable communication system,
wherein the method for behaviour-based authentication of the current user to a mobile, portable communication system comprises the following steps:
repeated execution of the steps:
capture of the gross-motor measurement data by the at least one sensor of the mobile, portable communication system,
input of the gross-motor measurement data into the gross-motor classification module,
generation of a first classification result by the gross-motor classification module, detailing whether the current user is a user registered in the mobile, portable communication system,
storage of the first classification result in the memory of the mobile, portable communication system access to the memory of the mobile, portable communication system in order to read out at least one of the stored first classification results from the memory,
reading out of the at least one first classification result and evaluating same in accordance with a specified checking criterion,
generation of an authentication signal if the checking criterion is met, wherein the authentication signal signals a successful authentication of the current user.

2. The method according to claim 1, wherein the mobile, portable communication system comprises an application behaviour classification module,
wherein the application behaviour classification module is configured for classification of application data and is trained for recognition of user-specific application patterns in the application data, wherein the application behaviour classification module is executed by the processor of the mobile, portable communication system,
wherein the method further comprises:
repeated execution of the steps:
capture of the application data,
input of the application data into the application behaviour classification module,
generation of a second classification result by the application behaviour classification module, detailing whether the current user is the user registered in the mobile, portable communication system,
storage of the second classification result in the memory of the mobile, portable communication system,
access to the memory of the mobile, portable communication system in order to read out at least one of the stored second classification results from the memory,
wherein the second classification result is also included in the evaluation of the first classification result in accordance with the checking criterion.

3. The method according to claim 2, wherein the application data comprises:
position data of the mobile, portable communication system, which are captured by a method for position determination by a sensor for determining the position of the mobile, portable communication system, and/or
application usage data of the current user, and/or
biometric data of the current user, which are captured by a sensor for capturing biometric data, and/or
connection data of the mobile, portable communication system to other devices and/or
calendar and/or time data of a clock implemented in the mobile, portable communication system or an external clock, the signal of which is received by a sensor of the mobile, portable communication system.

4. The method according to claim 1, wherein the mobile, portable communication system comprises a fine-motor classification module,
wherein the fine-motor classification module is configured for classification of fine-motor measurement data and is trained for recognition of a fine-motor movement of a registered user, wherein the fine-motor classification module is executed by the processor of the mobile, portable communication system, wherein the method further comprises:
repeated execution of the steps:
capture of the fine-motor measurement data,
input of the fine-motor measurement data into the fine-motor classification module,
generation of a third classification result by the fine-motor classification module, detailing whether the current user is the user registered in the mobile, portable communication system,
storage of the third classification result in the memory of the mobile, portable communication system,
access to the memory of the mobile, portable communication system in order to read out at least one of the stored third classification results from the memory,
wherein the third classification result is also included in the evaluation of the first classification result in accordance with the checking criterion.

5. The method according to claim 1, wherein at least one first pattern in the form of a first pattern function and at least one first comparison data set are stored in the memory of the mobile, portable communication system, wherein the first comparison data set comprises values for at least one first comparison parameter, wherein the gross-motor classification module performs the following steps when the gross-motor measurement data are input:
a. comparison of the captured gross-motor measurement data with the at least one first pattern function,
b. assignment of the gross-motor measurement data to the first pattern corresponding to the first pattern function and attainment of at least one first classification parameter assigned to the first pattern, if the gross-motor measurement data can be assigned to the at least one first pattern,
c. calculation of a confidence value for each first classification parameter by a comparison of the at least one first classification parameter with the relevant first comparison parameter of the first comparison data set, and
d. generation of the first classification result from the first confidence values of the first classification parameters.

6. The method according to claim 2, wherein at least one second pattern in the form of a second pattern function and at least one second comparison data set are stored in the memory of the mobile, portable communication system, wherein the second comparison data set comprises values for at least one second comparison parameter, wherein the application behaviour classification module performs the following steps when the application data are input:
a. comparison of the captured application data with the at least one second pattern function,
b. assignment of the application data to the second pattern assigned to the second pattern function and attainment of at least one second classification parameter corresponding to the second pattern, if the application data can be assigned to the at least one second pattern,
c. calculation of a confidence value for each second classification parameter by a comparison of the second classification parameter the relevant second comparison parameter of the second comparison data set, and
d. generation of the second classification result from the second confidence values of the second classification parameters.

7. The method according to claim 4, wherein at least one third pattern in the form of a third pattern function and at least one third comparison data set are stored in the memory of the mobile, portable communication system, wherein the third comparison data set comprises values for at least one third comparison parameter, wherein the fine-motor classification module performs the following steps when the fine-motor measurement data are input:
a. comparison of the captured fine-motor measurement data with the at least one third pattern function,
b. assignment of the fine-motor measurement data to the third pattern assigned to the third pattern function and attainment of at least one third classification parameter corresponding to the third pattern, if the fine-motor measurement data can be assigned to the at least one third pattern,
c. calculation of a confidence value for each third classification parameter by a comparison of the third classification parameter with the relevant third comparison parameter of the third comparison data set, and generation of the third classification result from the third confidence values of the third classification parameters.

8. The method according to claim 1, wherein the checking criterion is met if:
a. at least one of the first and/or second and/or third classification results exceed/exceeds a threshold value specified by the checking criterion and/or
b. a maximum age of the first and/or second and/or third classification results specified by the checking criterion is not exceeded and/or
c. a minimum number of first and/or second and/or third classification results exceeding the threshold value is present.

9. The method according to claim 2, wherein, at the time of evaluation of the first and second classification result, the second classification result is included only if, in one of the previous steps, the gross-motor classification module recognised a gross-motor movement of the current user in the gross-motor measurement data.

10. The method according to claim 4, wherein, at the time of evaluation of the first and third classification result, the third classification result is included only if, in one of the previous steps, the gross-motor classification module recognised a gross-motor movement of the current user in the gross-motor measurement data.

11. The method according to claim 4, wherein, as a result of an unsuccessful authentication of the current user to the mobile, portable communication system based on the first and/or a second classification result, only the evaluation of the third classification result is performed, in order to carry out a further authentication attempt.

12. The method according to claim 6, wherein the first classification result comprises first confidence values, the second classification result comprises the second confidence values, and/or the third classification result comprises third confidence values, and wherein the confidence values are processed by the processor of the mobile, portable communication system to give a resultant confidence value, wherein the resultant confidence value specifies a likelihood with which the current user is identified as the user registered in the mobile, portable communication system.

13. The method according to claim 12, wherein the individual confidence values of the first, second and/or third classification parameter are each provided at the time of the evaluation with a weighting factor, wherein the weighting factors are assigned to the respective confidence values.

14. The method according to claim 13, wherein the weighting factors are specified by the checking criterion.

15. The method according to claim 13, wherein the weighting factors are fixedly specified for the confidence values assigned to the respective weighting factors.

16. The method according to claim 13, wherein in an initialisation process the weighting factors of the confidence values are determined by the user and are stored in a configuration file in the memory of the mobile, portable communication system.

17. The method according to claim 1, wherein an application executed on the mobile, portable communication system sends a request to initiate the method for authentication of the current user to an operating system of the mobile, portable communication system, wherein the request contains the checking criterion.

18. The method according to claim 1, wherein the mobile, portable communication system has a connection to a network comprising at least one server system, wherein an online application executed on the server system sends a request to initiate the method for authentication of the user to an operating system of the mobile, portable communication system, wherein the request contains the checking criterion.

19. The method according to claim 1, wherein a number of users are registered on the mobile, portable communication system and a classification result is generated for each user, wherein the mobile, portable communication system has a user recognition module, wherein the user recognition module is configured to identify the current user as one of the registered users, wherein the user recognition module is executed by the processor of the mobile, portable communication system.

20. The method according to claim 19, wherein the current user is identified by the user recognition module based on a decision tree.

21. The method according to claim 19, wherein the user recognition module is configured to recognise a change of user on the basis of a gross-motor and/or a fine-motor movement of the change of user,
wherein the user recognition module is configured for a classification of the gross-motor measurement data and/or fine-motor measurement data and is trained for recognition of the gross-motor and/or fine-motor movement of the change of use of the mobile, portable communication system, wherein the user recognition module is executed by the processor of the mobile, portable communication system,
wherein the method further comprises:
repeated execution of the steps:
input of the gross-motor measurement data and/or fine-motor measurement data into the user recognition module,
generation of a fourth classification result by the user recognition module, detailing whether a change of user has occurred,
storage of the fourth classification result in the memory of the mobile, portable communication system,
access to the memory of the mobile, portable communication system in order to read out at least one of the stored fourth classification results from the memory,
evaluation of the at least one fourth classification result in order to check whether a change of user has occurred,
discardment of the previous first, second and/or third classification results if a change of user has occurred.

22. A system for behaviour-based authentication of a current user to a mobile, portable communication system, which has at least one sensor for capturing gross-motor measurement data, a gross-motor classification module, a processor and in internal memory,
wherein the sensor is designed to capture the gross-motor measurement data of a gross-motor movement of the current user of the mobile portable communication system,
wherein the gross-motor classification module is trained for classification of the gross-motor measurement data and is trained for recognition of the gross-motor movement of a registered user, wherein the gross-motor classification module is executed by the processor of the mobile portable communication system,
wherein the system for behaviour-based authentication of the current user to the mobile, portable communication system performs the following method steps:
repeated execution of the steps:
capture of the gross-motor measurement data by the at least one sensor of the mobile, portable communication system,
input of the gross-motor measurement data into the gross-motor classification module,
generation of a first classification result by the gross-motor classification module, detailing whether the current user is a user registered in the mobile, portable communication system,
storage of the first classification result in the memory of the mobile, portable communication system, and
access to the memory of the mobile, portable communication system in order to read out at least one of the stored first classification results from the memory,
evaluation of the at least one read-out classification result in accordance with a specified checking criterion,
generation of an authentication signal if the checking criterion is met, wherein the authentication signal signals a successful authentication of the user.

23. The system according to claim 22, wherein the mobile, portable communication system comprises an application behaviour classification module,
wherein the application behaviour classification module is configured for classification of application data and is trained for recognition of user-specific application patterns in the application data,
wherein the application behaviour classification module is executed by the processor of the mobile, portable communication system,
wherein the system also performs the method steps:
repeated execution of the steps:
capture of the application data,
input of the application data into the application behaviour classification module,
generation of a second classification result by the application behaviour classification module, detailing whether the current user is the user registered in the mobile, portable communication system,
storage of the second classification result in the memory of the mobile, portable communication system,
access to the memory of the mobile, portable communication system in order to read out at least one of the stored second classification results from the memory,
wherein the second classification result is also included in the evaluation of the first classification result in accordance with the checking criterion.

24. The system according to claim 23, wherein the application data comprises:

position data of the mobile, portable communication system, which are captured by a method for position determination by a sensor for determining the position of the mobile, portable communication system, and/or application usage data of the current user, and/or biometric data of the current user, which are captured by a sensor for capturing biometric data, and/or connection data of the mobile, portable communication system to other devices and/or calendar and/or time data of a clock implemented in the mobile, portable communication system or an external clock, the signal of which is received by a sensor of the mobile, portable communication system.

25. The system according to claim 22, wherein the mobile, portable communication system comprises a fine-motor classification module,
wherein the fine-motor classification module is configured for classification of fine-motor measurement data and is trained for recognition of a fine-motor movement of a registered user, wherein the fine-motor classification module is executed by the processor of the mobile, portable communication system
wherein the system also performs the method steps:
repeated execution of the steps:
capture of the fine-motor measurement data,
input of the fine-motor measurement data into the fine-motor classification module,
generation of a third classification result by the fine-motor classification module, detailing whether the current user is the user registered in the mobile, portable communication system,
storage of the third classification result in the memory of the mobile, portable communication system,
access to the memory of the mobile, portable communication system in order to read out at least one of the stored third classification results from the memory,
wherein the third classification result is also included in the evaluation of the first classification result in accordance with the checking criterion.

26. The system according to claim 22, wherein at least one first pattern in the form of a first pattern function and at least one first comparison data set are stored in the memory of the mobile, portable communication system, wherein the first comparison data set includes values for at least one first comparison parameter, wherein the gross-motor classification module performs the following steps when the gross-motor measurement data are input:
a. comparison of the captured gross-motor measurement data with the at least one first pattern function,
b. assignment of the gross-motor measurement data to the first pattern assigned to the first pattern function and attainment of at least one first classification parameter corresponding to the first pattern, if the gross-motor measurement data can be assigned to the at least one first pattern,
c. calculation of a first confidence value for each first classification parameter by a comparison of the first classification parameter with the relevant first comparison parameter of the first comparison data set, and
d. generation of the first classification result from the first confidence values of the first classification parameters.

27. The system according to claim 26, wherein at least one second pattern in the form of a second pattern function and at least one second comparison data set are stored in the memory of the mobile, portable communication system, wherein the second comparison data set includes values for at least one second comparison parameter, wherein the application behaviour classification module performs the following steps when the application data are input:
a. comparison of the captured application data with the at least one second pattern function,
b. assignment of the application data to the second pattern assigned to the second pattern function and attainment of at least one second classification parameter corresponding to the second pattern, if the application data can be assigned to the at least one second pattern,
c. calculation of a second confidence value for each second classification parameter by the comparison of the second number of second classification parameters with the relevant second comparison parameter of the second comparison data set, and
d. generation of the second classification result from the second confidence values of the second classification parameters.

28. The system according to claim 22, wherein at least one third pattern in the form of a third pattern function and at least one third comparison data set are stored in the memory of the mobile, portable communication system, wherein the third comparison data set comprises values for at least one third comparison parameter, wherein the fine-motor classification module performs the following steps when the fine-motor measurement data are input:
a. comparison of the captured fine-motor measurement data with the at least one third pattern function,
b. assignment of the fine-motor measurement data to the third pattern assigned to the third pattern function and attainment of at least one third classification parameter corresponding to the third pattern, if the fine-motor measurement data can be assigned to the at least one third pattern,
c. calculation of a confidence value for each third classification parameter by a comparison of the third classification parameter with the relevant third comparison parameter of the third comparison data set, and generation of the third classification result from the third confidence values of the third classification parameters.

* * * * *